United States Patent
Goldstein

(10) Patent No.: US 10,889,736 B2
(45) Date of Patent: Jan. 12, 2021

(54) LOW VOC POLYMERS WITH RELEASE PROPERTIES

(71) Applicant: OMNOVA Solutions Inc., Beachwood, OH (US)

(72) Inventor: Joel E. Goldstein, Cleveland, OH (US)

(73) Assignee: OMNOVA Solutions Inc., Beachwood, OH (US)

(*) Notice: Subject to any disclaimer, the term of this patent is extended or adjusted under 35 U.S.C. 154(b) by 117 days.

(21) Appl. No.: 15/122,051

(22) PCT Filed: Mar. 30, 2015

(86) PCT No.: PCT/US2015/023385
§ 371 (c)(1),
(2) Date: Aug. 26, 2016

(87) PCT Pub. No.: WO2015/153484
PCT Pub. Date: Oct. 8, 2015

(65) Prior Publication Data
US 2017/0015873 A1    Jan. 19, 2017

Related U.S. Application Data

(60) Provisional application No. 61/972,370, filed on Mar. 30, 2014, provisional application No. 62/047,548, filed on Sep. 8, 2014.

(51) Int. Cl.
| C09J 7/40 | (2018.01) |
| C08F 220/36 | (2006.01) |
| C08G 18/81 | (2006.01) |
| C08G 18/67 | (2006.01) |
| C08G 18/71 | (2006.01) |
| C08G 18/28 | (2006.01) |
| C09J 7/20 | (2018.01) |
| C09J 7/22 | (2018.01) |
| B32B 7/12 | (2006.01) |
| B32B 37/26 | (2006.01) |
| C09D 133/14 | (2006.01) |
| C08F 220/34 | (2006.01) |

(52) U.S. Cl.
CPC .......... *C09J 7/401* (2018.01); *B32B 7/12* (2013.01); *B32B 37/26* (2013.01); *C08F 220/36* (2013.01); *C08G 18/2825* (2013.01); *C08G 18/6715* (2013.01); *C08G 18/71* (2013.01); *C08G 18/815* (2013.01); *C08G 18/8116* (2013.01); *C08G 18/8175* (2013.01); *C09D 133/14* (2013.01); *C09J 7/201* (2018.01); *C09J 7/22* (2018.01); *B32B 2037/268* (2013.01); *B32B 2405/00* (2013.01); *C08F 2220/346* (2013.01); *C09J 2301/40* (2020.08); *C09J 2301/414* (2020.08); *C09J 2433/005* (2013.01)

(58) Field of Classification Search
CPC .............. C08F 220/36; C08F 2220/365; C08F 220/34; C08F 2220/343; C08F 2220/346; C08F 220/38; C08F 2220/382; C08F 2220/385; C08F 2220/387; C09D 133/14; C08G 18/2825; C08G 18/815; C08G 18/8116; C08G 18/71; C08G 18/672; C08G 18/6715; B32B 2037/268
See application file for complete search history.

(56) References Cited

U.S. PATENT DOCUMENTS

| 4,495,243 A | 1/1985 | Kishi |
| 5,516,865 A | 5/1996 | Urquiola |
| 6,352,766 B1 | 3/2002 | Crandall et al. |
| 8,980,406 B2 | 3/2015 | Xu |
| 2009/0148813 A1 | 6/2009 | Sun et al. |
| 2010/0068156 A1* | 3/2010 | Kim ..... A61K 8/8111 424/45 |
| 2016/0186220 A1 | 6/2016 | Fleckenstein et al. |

FOREIGN PATENT DOCUMENTS

| EP | 0 448 399 B1 | 8/1996 |
| JP | 59-059776 S | 4/1984 |

OTHER PUBLICATIONS

Print out of Volatile Organic Compounds (VOC) Analysis webpage by ThermoFisher Scientific, available at https://www.thermofisher.com/us/en/home/industrial/environmental/environmental-learning-center/contaminant-analysis-information/volatile-organic-compounds-analysis.html (accessed Jun. 22, 2019) (Year: 2019).*
SIPO action in CN appl. No. 201580012116.X, dated May 9, 2018—14 pp. + 18-pg. translation.
CNIPA action in CN appl. No. 201580012116.X, dated Jan. 24, 2019—12 pp. + 21-pg. translation.
Examination report in TW appl. No. 104110281, dated Feb. 26, 2019.
Taiwan Patent Office action in TW appl. No. 104110281, dated Nov. 26, 2018—7 pp. + 7-pg. translation.
EPO examination report in EP appl. No. 15774354.3, dated Nov. 12, 2018—3 pp.
JPO examination report in JP appl. No. 2016-559653, dated Nov. 5, 2018—6 pp. + 5-pg. translation.
Official action in CN appl. No. 201580012116, dated Aug. 6, 2019.
Official action (allowability) in EP appl. No. 15774354, dated Aug. 16, 2019.
Examination report in TW Appl. No. 104110281, dated Nov. 15, 2019.
Examination report in JP Appl. No. 2016-559653, dated Aug. 27, 2019.
Report of analytical testing results of latex sample prepared in accordance with Ex. 10 from EP 0 448 399 B1, dated Oct. 28, 2019.

* cited by examiner

Primary Examiner — Scott R. Walshon
(74) Attorney, Agent, or Firm — Zollinger & Burleson Ltd.

(57) ABSTRACT

A polymer that can be used as a release coating or a release agent in an LAB, either of which can be provided in VOC-free form and which exhibits excellent release even after aging under high humidity, includes mer that contain pendent groups that include carbamate functionalities.

16 Claims, No Drawings

LOW VOC POLYMERS WITH RELEASE PROPERTIES

CROSS-REFERENCE TO RELATED APPLICATIONS

This is a national stage entry application of international application no. PCT/US2015/023385, filed 30 Mar. 2015, and claims the benefit of U.S. provisional patent application Nos. 61/972,370, filed 30 Mar. 2014, and 62/047,548, filed 8 Sep. 2014.

BACKGROUND INFORMATION

Adhesive tapes, which are typically provided in roll form, are highly engineered articles that include as primary elements a substrate and, provided on opposite primary surfaces of the substrate, an adhesive and a low adhesion backsize (LAB). The latter improves handling characteristics, providing reversible adhesion or an ability to unwind a roll product despite the fact that the adhesive layer borne on one layer of substrate is adjacent to another layer of the substrate. For more information on the composition and common physical forms of LABs, the interested reader is directed to Chapter 26 in D. Satas, "Release Coatings," i Handbook of Pressure Sensitive Adhesive Technology, 3d ed. (1999).

Traditionally, LABs have been provided by application of a liquid composition (e.g., emulsion, suspension or dispersion) to a substrate followed by drying, a process which permitted a film-forming polymer to form on the substrate and provide a network in which was entrained one or more release agents. The liquid component of the solution transitioned from quickly evaporating volatile organic chemicals (VOCs) to water for a variety of reasons including, inter alia, reduced odor and reduced flammability.

Because many release agents have limited to no solubility in water, other coating alternatives have been explored. To maintain the gains in VOC reduction, a popular solventless option has involved extrusion of an LAB composition that includes one or more release agent(s) blended with an extrudable polymer, such as a polyolefin. This coating method is relatively effective as long as the LAB composition can be extruded at a temperature that does not damage the substrate and does not require too much energy, e.g., ~100° C. or less.

Examples of release agents include nonionic surfactants, long chain alkyl carboxylic acids and esters, (meth)acrylates with long chain side groups, polyurethanes, silicone polymers (particularly polydialkylsiloxane homo- and copolymers), and fluorinated polymers and waxes. For more information on release agents, the interested reader is directed to any of a variety of texts and overviews such as, e.g., Chapter 12 in Kenning and Schneider, "Release Coatings for Pressure Sensitive Adhesives," Adhesion Science and Engineering—Surfaces, Chemistry, and Applications, pp. 535-71 (2002).

Silicone-based compounds, alone or blended with a hydrocarbon polymer, can be very effective release agents. However, small amounts of the silicone compound often transfer to the adhesive, which can give rise to defective electrical contact in electronic parts and imperfections in surfaces to be painted (often referred to as "craters" or "fisheyes").

Certain types of adhesive articles employ a silicone-free LAB, and many of these involve poly(vinyl octadecyl carbamate) (PVODC) as a release agent. PVODC has been found to adhere well to many substrates typically employed in tape and label applications including polymeric films and paper (typically saturated with a latex), not only immediately after application but even after being aged under high humidity conditions. This ability to perform after high humidity aging is important because a finished tape roll typically is stored for many months under varying conditions, and the release properties of the tape must remain within relatively narrow tolerances during that time. PVODC also works well with many of the most-widely used adhesives, including natural rubber, acrylics and hot melts. Although PVODC is relatively expensive, its consistent and predictable performance is highly valued.

PVODC frequently is provided as a solid that is added to an organic solvent such as toluene, which subjects users to relatively strict regulatory standards.

Water-based PVODC compositions are available, but they are made by dissolving a small amount of PVODC in an organic liquid, typically toluene, and then emulsifying the organic solution in water. Manufacturers try to strip off solvent after emulsification, but up to several hundred parts per million (ppm) VOCs typically remain.

Further, PVODC is provided by reacting poly(vinyl alcohol) (PVOH) with octadecyl isocyanate. The $M_w \approx 125 \pm 75$ kg/mol PVOH used in the manufacture of PVODC is soluble in water, but water cannot be present during reaction of PVOH with the isocyanate. This means that the PVOH must be dissolved or dispersed in a polar organic liquid such as DMF or DMSO or suspended or dispersed in a hydrocarbon liquid such as toluene or xylene. Small amounts of these solvents likewise can get carried through into the final LAB product.

That which remains desirable is a release agent that is manufactured and provided in such a way that VOCs are avoided, yet provides consistent release properties even when aged under high humidity conditions and does not transfer to adjacent adhesives.

SUMMARY

Provided herein are polymers that can be used as a release coating or a release agent in a LAB, either of which can be provided in VOC-free form and which exhibit excellent release even after aging under high humidity.

The polymer can include mer units that contain pendent groups that include at least two (thio)carbonyl groups and multiple additional heteroatoms.

In certain embodiments, the C atom of one of the (thio) carbonyl moieties of the pendent groups is bonded to two additional heteroatoms, one of which is N and the other is selected from O, S and N. In some of these embodiments, the pendent groups can be represented by the chemical formula

(I-a)

where X represents O or S, E represents an O or S atom or a NR' group where R' is H or a $C_1$-$C_6$ alkyl group, $R^2$ represents a lower alkyl, aryl, alkaryl or aralkyl group (optionally containing a heteroatom such as O, with the proviso that no active hydrogen atoms are present), Z represents a divalent (thio)carbonyl-containing group that further includes two additional heteroatoms bonded to the C atom of the (thio)carbonyl moiety, and $R^3$ represents a long chain alkyl group or a larger functionality that includes a long chain alkyl group. Examples of additional heteroatoms that can be bonded to the C atom of the carbonyl moiety in Z include O, S and N; at least one of the additional heteroatoms typically is N. (The predominant form of Z depends on the particular identities of E and X and, to some extent, the conditions under which the reaction is conducted.)

The polymer also or alternatively can include mer that contain a pendent group represented by the chemical formula

—(X)$_n$—R$^7$—Z—R$^3$      (I-b)

where X, Z and R$^3$ are defined as above, n is 0 or 1, and R$^7$ is a phenyl or C$_1$-C$_6$ alkyl group.

Methods for providing VOC-free, carbamate group-containing polymers of the type just described, which can be used as a release coating or a release agent in an LAB, also are provided. One such method involves reacting a mono-iso(thio)cyanate having a long chain alkyl group with a polymerizable compound, such as a (meth)acrylate-type compound, a substituted styrene, an allyl alcohol or an alkanediol vinyl ether, that includes an EH group and then polymerizing the product in water. Another method involves reacting a polymerizable mono-iso(thio)cyanate with a long chain compound that includes an EH group and then polymerizing the product in water. Yet another method involves reacting a polyiso(thio)cyanate, particularly a diiso(thio)cyanate, with, in either order, a long chain compound that includes an EH group and a polymerizable compound that includes an EH group and then polymerizing the reaction product in water. (The E variable referenced in this paragraph is defined as above.)

In each of the foregoing methods, the carbamate groups are formed in the presence of an excess of one or more EH group-containing compounds such as an alcohol (i.e., more equivalents of OH groups than NCO groups). The EH group-containing compound either is long chain, and thus not volatile, or includes a polymerizable group that permits it to be incorporated into the polymer chain. Further, the polymerizations are carried out in water, meaning that no residual solvent is trapped in or carried along with the polymer.

In each of the foregoing methods, the polymerization product can be a homopolymer, i.e., a polymer containing only mer units that include a carbamate moiety-containing pendent group such as, but not limited to, the ones shown above in general formulae (I-a) and (I-b). Also provided is an interpolymer that contains mer that includes a carbamate moiety in a pendent group and other mer that includes long chain alkyl group and/or that increases or does not substantially decrease the glass transition temperature (T$_g$) and/or melt temperature (T$_m$) of the resulting polymer, as well as methods of providing such an interpolymer. Any such interpolymer preferably contains a plurality, more preferably a majority, of mer units that include a carbamate moiety-containing pendent group.

Advantageously, the foregoing compounds, polymers and methods are VOC-free, as defined below, and do not generate formaldehyde when processed (e.g., dried) under typical manufacturing conditions.

Further, the polymers exhibit good adhesion to the most commonly employed types of substrates for articles such as label liners and wound tapes, both at the time of application and even after being aged under high humidity and/or at low or high temperatures.

They also provide good release from a wide variety of adhesives including, but not limited to, natural rubber, acrylics and hot melts.

Accordingly, another aspect of the invention involves articles that include a surface bearing an adhesive layer and, in contact with the adhesive layer, a surface bearing a release layer that includes at least one of the foregoing release polymers. In a tape article, the adhesive layer and release layer can be on opposite sides of the same substrate. In a label article, the adhesive layer can be applied to one substrate while the release layer is applied to another substrate, with the two substrates being arranged such that the adhesive layer and release layer are in direct contact.

Also provided are methods of making such articles.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"comprising" means including but not limited to the listed ingredients;

"consisting of" means including only the listed ingredients and minor amounts of inactive additives or adjuvants;

"consisting essentially of" means including only the listed ingredients, minor amounts (less than 5%, 4%, 3%, 2%, 1%, 0.5%, 0.25%, or 0.1% w/v) of other ingredients that supplement the release property of the polymer, coating or LAB and/or provide a secondary effect (e.g., resistance to oxidation) that is desirable in view of the intended end use, and/or inactive additives or adjuvants;

"polymer" means the polymerization product of one or more monomers and is inclusive of homo-, co-, ter-, tetra-polymers, etc.;

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"mer" or "mer unit" means that portion of a polymer derived from a single reactant molecule (e.g., ethylene mer has the general formula —CH$_2$CH$_2$—);

"substituted" means one containing a heteroatom or functionality (e.g., hydrocarbyl group) that does not interfere with the intended purpose of the group in question;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"release agent" means a compound or mixture of compounds that is designed or intended to permit an adhesive to smoothly and controllably release from a surface to which the compound(s) is/are applied without transferring to that adhesive during the release process;

"release polymer" means a polymeric release agent;

"VOC-free" means exhibiting, when subjected to standard analytical testing procedures, generally less than 0.5 ppm, commonly less than 0.25 ppm, typically less than 0.1 ppm, and preferably less than 0.05 ppm of volatile organic chemicals;

the formative "(thio)" indicates an intent to include the S-containing analog of the compound or group used in connection with the formative;

"low adhesion backsize" or "LAB" means a composition that includes at least a coating polymer and a release agent, often in combination with ingredients that include one or more surfactants;

"iso(thio)cyanate" means a group of the general formula —N=C=O or —N=C=S or a compound that includes such a group;

"(meth)acrylate" means methacrylate or acrylate;

"active hydrogen" is an H atom that results in the production of methane when the compound in which the H atom is contained is subjected to Zerewitinoff determination testing;

"lower alkyl" means an alkyl group that contains no more than 6 C atoms;

"long chain alkyl" means an alkyl group that contains at least 12 C atoms;

"phm" means parts by weight (pbw) per 100 pbw monomer; and

"radical" means that portion of a molecule which remains after reacting with another molecule, regardless of whether any atoms are gained or lost as a result of the reaction.

DETAILED DESCRIPTION

The aforedescribed polymers can act as release polymers and can be used to provide release coatings and/or be blended with one or more other polymers (and optional adjuvants) to provide LABs.

Substrates typically used for medical, electronic, and packaging tapes include, but are not limited to, paper (saturated or not), metallic and metalized sheets and foils, nonwoven fabrics, cellophane, films of thermoplastic resins, and acetate films. The substrate can be primed if necessary or desired on either or both primary surfaces.

One primary surface of the substrate is coated with a layer (of conventional thickness) of adhesive, typically a pressure sensitive adhesive (PSA), that includes one more polymers such as natural rubber, butyl rubber, vinyl ethers, any of a variety of acrylates, polymers including polyene mer, particularly polydienes such as 1,3-butadiene, isoprene and the like, block copolymers (e.g., SBS, SIS, etc.), random copolymers (e.g., SBR), silicone rubber, and the like. The foregoing are to be considered exemplary and not limiting, with the release polymers of the present invention having been seen to work well with many types of adhesives.

The other primary surface of the substrate is provided with a composition that includes a polymer having pendent groups which include carbamate moieties. In certain embodiments, this polymer is a release polymer and can be used without a coating polymer and/or separate release agent. In other embodiments, this polymer can constitute one ingredient of an LAB, i.e., can be blended with one or more coating polymers and/or other ingredients.

For reasons including availability, cost and ease of polymerization, most polymers of the type just described will be provided from vinyl monomers.

One embodiment of the type of polymer just described has pendent groups of the type described above in general formula (I-a). This group of exemplary polymers can be prepared using one of two general synthetic routes.

In one synthetic route, a long chain mono-iso(thio)cyanate can be reacted with a polymerizable compound that includes an active hydrogen atom-containing functional group not involved in the process by which the compound is polymerized. In another route, a long chain compound that includes an active hydrogen atom-containing functional group can be reacted with a polymerizable compound that includes an iso(thio)cyanate group not involved in the process by which the compound is polymerized. These are identified as, respectively, Process 1a and Process 1b in the discussion that follows.

The long chain mono-iso(thio)cyanate of Process 1a can be represented by the general formula

where X represents O or S and $R^3$ represents a long chain alkyl group (or a larger functionality that includes a long chain alkyl group) such as specifically a $C_{15}$-$C_{25}$, preferably $C_{16}$-$C_{20}$, more preferably $C_{17}$-$C_{18}$, substituted or unsubstituted alkyl group. Non-limiting examples of compounds defined by general formula (II) include hexadecyl iso(thio)cyanate, heptadecyl iso(thio)cyanate, octadecyl iso(thio)cyanate, and nonadecyl iso(thio)cyanate. For a variety of reasons not necessarily relating to efficacy, those general formula (II) compounds where X is an oxygen atom are preferred.

In Process 1a, a general formula (II) compound can be reacted with a polymerizable compound that includes an active hydrogen atom-containing functional group, for example, a (meth)acrylate derivative such as any of those represented by the general formula

where $R^2$, E and X are defined as above; $R^1$ is H or a methyl group. In certain embodiments, $R^2$ preferably is a $C_1$-$C_6$ alkyl group.

Polymerizable compounds such as those defined by general formula (III) having an active hydrogen atom-containing functional group are intended to be exemplary and not limiting. Other classes can be envisioned by the ordinarily skilled artisan.

Each of the general formula (II)- and (III)-type compounds is a liquid or a solid that melts under conditions that do not lead to premature polymerization. This permits the reaction of a general formula (II)-type compound with a general formula (III)-type (or similar) compound to be performed in a VOC-free manner, meaning that the reaction product likewise is free of VOCs. This reaction can be performed at any temperature where the reactants are at least flowable, preferably liquid, with 15° to 95° C. being common, 20° to 85° C. being typical, and 25° to 80° C. being preferred. To increase the rate of reaction, a catalyst such as an organometallic sulfide can be added to the reaction vessel.

The reaction product of a general formula (II)-type compound with a general formula (III)-type (or similar) compound can be represented by the following general formula, with all variables being defined as above:

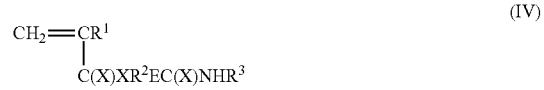

The long chain compound that includes an active hydrogen atom-containing functional group of Process 1b can be represented by the general formula

where $R^3$ and E are defined as above. For a variety of reasons not necessarily relating to efficacy, those general formula (V) compounds where E is an oxygen atom are preferred. Non-limiting examples of compounds defined by general formula (V) include hexadecanol, heptadecanol, octadecanol, nonadecanol, hexadecylamine, heptadecylamine, octadecylamine, nonadecylamine, and octadecyl mercaptan.

In Process 1b, a general formula (V)-type compound can be reacted with a polymerizable compound that includes an iso(thio)cyanate group not involved in the process by which the compound is polymerized, for example, a (meth)acrylate derivative such as any of those represented by the general formula

where $R^1$, $R^2$ and X are defined as above. In certain embodiments, each X can be an oxygen atom. These (meth)acrylate derivatives are intended to be exemplary and not limiting; other classes can be envisioned by the ordinarily skilled artisan.

Each of the general formula (V)- and (VI)-type compounds is a liquid or a solid that melts under conditions that do not lead to premature polymerization. This permits the reaction of a general formula (V)-type compound with a general formula (VI)-type compound to be performed in a VOC-free manner, meaning that the reaction product likewise is free of VOCs. This reaction can be performed at any temperature where the reactants are at least flowable, preferably liquid, with 15° to 95° C. being common, 20° to 85° C. being typical, and 25° to 80° C. being preferred. To increase the rate of reaction, a catalyst such as an organometallic sulfide can be added to the reaction vessel.

The reaction product of Process 1b can be represented by the following general formula:

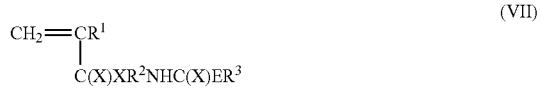

where $R^1$, $R^2$, $R^3$, X and E are defined as above. In certain embodiments, each X can be an oxygen atom.

Another embodiment of the polymer having pendent groups which include carbamate moieties can be prepared by in a two step reaction scheme starting with a diiso(thio)cyanate having iso(thio)cyanate groups with differing reactivities. Non-limiting examples of such diiso(thio)cyanates include isophorone diisocyanate (IPDI), 2,4-toluene diisocyanate (2,4-TDI), and the like, as well as sulfur analogs of each. In the description that follows, IPDI is used as an exemplary diiso(thio)cyanate, but that choice is not to be considered limiting; other diiso(thio)cyanates are expected to work similarly.

In this scheme, hereinafter referred to as Process 2, IPDI is reacted with two EH group-containing compounds (with the proviso that, if E=NR', then R' preferably is not H so as to prevent interfering reactions), one of which includes a polymerizable functionality and the other of which includes a long chain alkyl group (or a larger functionality that includes a long chain alkyl group) such as specifically a $C_{15}$-$C_{25}$, preferably $C_{16}$-$C_{20}$, more preferably $C_{17}$-$C_{18}$, substituted or unsubstituted alkyl group. Non-limiting examples of the first type of EH group-containing compound include those depicted above in general formula (III), while non-limiting examples of the second type of EH group-containing compound include those depicted above in general formula (V).

The order in which the two types of active hydrogen group-containing compounds are reacted with IPDI is not believed to be particularly important, and the conditions under which these reactions occur are essentially identical to those provided above in connection with Processes 1a and 1b.

The product of Process 2 can be represented by the general formula

where X, E and $R^3$ are defined as above, $R^4$ is the radical of a hydrocarbon compound having two iso(thio)cyanate groups of differing reactivities, and $R^5$ is a polymerizable group, optionally but typically bonded to the adjacent E atom through a linear or cyclic linking group, e.g., a —$R^2XC(X)$— group.

Once a general formula (VIII) compound is polymerized, the resulting pendent group can be represented by the general formula

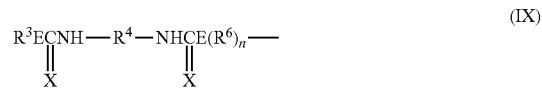

where X, E and n are defined as above, $R^4$ is the radical of a hydrocarbon compound having two iso(thio)cyanate groups of differing reactivities, and $R^6$ is a linking group of the type described above, with specific examples including carbonyl, ether and amine groups. General formula (IX) pendent groups are similar to those defined by general formula (I) with the exception that Z and $R^3$ (from general formula (I)) are not directly bonded but, instead, separated by an additional linking group.

Another class of polymerizable compounds that include an active hydrogen atom-containing functional group can be represented by the general formula

where $R^1$, E, X and n are defined as above and $R^7$ represents a phenyl or lower alkylene group. In certain embodiments, each X can be an oxygen atom.

One subset of general formula (X)-type compounds where n is 0 is the substituted styrenes, including those defined by the general formula

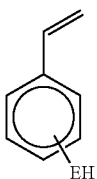

(X-a)

where E is defined as above. Variants of this formula also are possible; for example, α-methyl styrene analogs of general formula (X - a) compounds are expected to be useful, as are compounds in which the EH group is indirectly bonded to the styrene ring, e.g., through a hydrocarbyl linking group.

Another subset of general formula (X)-type compounds where n is 0 is the vinyl alcohols/ethers, i.e., general formula (X) compounds with $R^7$ being a lower alkyl group, preferably a $C_1$-$C_3$ alkylene group, more preferably a $C_1$-$C_2$ alkylene group. Also contemplated are sulfur and amine analogs of these compounds, i.e., embodiments where E=S or NR'.

One subset of general formula (X)-type compounds where n is 1 is the diol vinyl ethers, i.e., general formula (X) compounds with X being an O atom and $R^7$ being a lower alkylene group, preferably a $C_1$-$C_4$ alkylene group. Also contemplated are sulfur and amine analogs of these compounds, i.e., embodiments where E=S or NR', as well as those analogs where X=S.

In a reaction scheme referred to herein as Process 3, a general formula (II)-type compound can be reacted with a general formula (X)-type (or similar) compound, resulting in a product which can be represented by the following general formula, with all variables being defined as above:

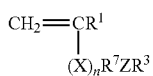

(XI)

(with the predominant form of Z depending on the particular identities of E and X and, to some extent, the conditions under which the reaction is conducted). Polymers resulting from polymerization of general formula (XI)-type compounds have hydrocarbon backbones with multiple pendent groups defined by general formulae (I - b) above.

As a specific non-limiting example, the compound of general formula (X-a) an be reacted with a general formula (II) compound to provide a compound that can be represented as

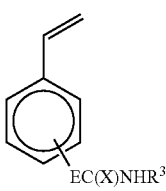

(XI-a1)

with E, X and $R^3$ being defined as above. The ordinarily skilled artisan can envision the reaction products of a general formula (II) compound with a variety of other general formula (X) compounds given the preceding description.

Compounds having any of general formulae (IV), (VII), (VIII) and (XI) scan be polymerized in an aqueous medium using any of a variety of emulsion techniques. While they can be prepared by alternative techniques including solution polymerization and subsequent dispersion in water, techniques that can introduce VOCs into the resulting polymer product are not preferred.

Emulsion polymerizations have been conducted for decades, so the general aspects thereof are quite familiar to the ordinarily skilled artisan. Nevertheless, a general description follows for convenience of reference.

In emulsion polymerizations, ionic and/or nonionic emulsifiers and/or protective colloids or stabilizers can be employed as interface-active compounds, although small molecule emulsifiers, particularly anionic and non-ionic surfactants, are preferred. Where more than one interface-active substance is employed, the individual substances must be compatible with one another.

Exemplary surfactants include $C_8$-$C_{36}$ ethoxylated fatty alcohols, $C_4$-$C_9$ ethoxylated mono-, di- and trialkylphenols, alkali metal salts of dialkyl esters of sulfosuccinic acid, as well as alkali metal and ammonium salts of $C_8$-$C_{12}$ alkyl sulfates, of $C_{12}$-$C_{18}$ ethoxylated alkanols, of $C_4$-$C_9$ ethoxylated alkylphenols, of $C_{12}$-$C_{18}$ alkylsulfonic acids and of $C_9$-$C_{18}$ alkylarylsulfonic acids. Also potentially useful are alkyldiphenyloxide disulfonates such as DOWFAX™ 2A1 surfactant (Dow Chemical Co.; Midland, Mich.).

The interface-active compound can be used in amounts of from 0.1 to 10% (w/w), commonly from 0.15 to 7.5% (w/w), and typically from 0.2 to 5% (w/w), all based on the weight of monomers being polymerized.

Water-soluble initiators include, for example, ammonium and alkali metal salts of peroxodisulfuric acid, for example sodium peroxodisulfate, hydrogen peroxide or organic peroxides such as tert-butyl hydroperoxide.

Redox initiator systems also are suitable. These systems consist of an oxidizing agent such as, for example, an initiator of the type described above and at least one, usually inorganic, reducing agent. Exemplary reducing agents include, for example, alkali metal salts of sulfurous acid, for example sodium sulfite, sodium hydrogen sulfite, alkali metal salts of disulfurous acid, such as sodium disunite, bisulfite addition compounds of aliphatic aldehydes and ketones, such as acetone bisulfite, or reducing agents such as hydroxymethanesulfinic acid and salts thereof, or ascorbic acid. (The reducing and oxidizing components also can be mixtures of two or more individual such components, e.g., a mixture of the sodium salt of hydroxymethanesulfinic acid and sodium disunite can be the reducing component.)

A redox initiator system also can include one or more soluble metal compounds where the metal can exist in more than one valence state.

Non-limiting examples of redox initiator systems include ascorbic acid/iron(II) sulfate/sodium n peroxodisulfate, tert-butyl hydroperoxide/sodium disunite, and tert-butyl hydroperoxide/sodium hydroxymethanesulfinic acid.

The initiating component(s) typically are provided in the form of aqueous solutions, with the amount of actives ranging from ~0.1 to ~30% (w/w), commonly from ~0.5 to ~20% (w/w), and typically from ~1 to ~10% (w/w), all based on the weight of the carrying fluid, i.e., water.

Sufficient initiating solution(s) is/are added so that the amount of initiator(s), based on the monomers to be polymerized, ranges from 0.1 to 10% (w/w), commonly from 0.5 to 5% (w/w).

Molecular weight regulators such as chain transfer agents also can be employed where desired. Such materials typically are present at no more than ~0.8 phm. Commonly employed molecular weight regulators typically include a thiol group, e.g., tert-butyl mercaptan, ethylacryloyl thioglycolate, mercaptoethynol, mercaptopropyltrimethoxysilane and tert-dodecyl mercaptan.

The polymerization medium preferably is water, with polymerizations generally being effected from ~30° to 95° C., commonly from ~50° to ~90° C., typically from ~60° to ~80° C.

The polymerization can be performed either as a batch process or in the form of a feed process, including stages or gradient methods where a portion of the polymerization batch is initially charged and heated to the polymerization temperature, polymerization is commenced and then the remainder of the polymerization batch, typically via a plurality of spatially separate feeds of which one or more comprises the monomers in pure or in emulsified form, is fed to the polymerization zone continuously, stepwise or with superimposition of a concentration gradient.

The individual components can be fed to the reactor from the top, in the side or from below through the reactor bottom.

If desired, a seed polymer can be provided or generated in situ for better control of particle size.

The initiating system either can be initially charged fully into the polymerization vessel or be added continuously or in stages according to its consumption in the course of the emulsion polymerization, depending on the chemical nature of the initiator system and the polymerization temperature. After 80-95% of the charged monomers have been converted, i.e., polymerized, an additional aliquot of initiator can be added to complete the conversion.

The result of an emulsion polymerization process affords aqueous dispersions of the polymer, generally with solids contents of from ~15 to ~75% (w/w), preferably from ~20 to ~70% (w/w), with preference is given to a solids content of from ~25 to 65% (w/w). Maximizing solids content generally is desirable, a characteristic that can be facilitated by a polymodal particle size distribution. A second or subsequent particle size can be generated by introduction of a seed polymer, by adding excess emulsifier, or by adding mini-emulsions.

The polymer thus prepared can be used in the form of its aqueous dispersion or can be recovered and further processed.

Many hydrophobic monomers are so water insoluble that they cannot be polymerized easily by conventional emulsion polymerization methods. This is due, primarily, to the monomer molecules not diffusing readily from the aqueous micelles into the growing polymer particles. In such cases, the emulsion polymerization just described can be supplemented or fully or partially substituted with the so-called mini-emulsion technique, where mechanical homogenization is used to pre-emulsify hydrophobic, water-insoluble monomers into suitably sized micro-droplets. Pre-emulsification is achieved by subjecting a mixture of monomers, water and surfactant to high shear in a homogenizing unit.

The pre-emulsified mixture then is charged to a polymerization reactor, with slow introduction of initiator. Polymerization typically occurs in the monomer droplets rather than in separate micelles (as is the case in traditional emulsion polymerizations).

Because the monomers employed in the aforedescribed polymerizations are so hydrophobic, a separate hydrophobic material (used to reduce Ostwald ripening) typically can be omitted. The resulting particle sizes usually are larger than those from traditional emulsion polymerizations, leading to somewhat lower molecular weights.

For more information on this technique, the interested reader is directed to a more full description such as can be found in F. J. Schork et al., "Miniemulsion Polymerization," Adv. Polym. Sci., vol. 175, pp. 129-255 (2005, Springer-Verlag) and/or U.S. Pat. Nos. 6,242,531 and 6,784,246 and patent documents cited therein or which cite those patents.

Polymers resulting from polymerization of general formulae (IV) or (VII) compounds have hydrocarbon backbones with multiple pendent groups defined by general formula (I-a) above. Polymerization of a general formula (IV) compound can result in a homo- or interpolymer that includes pendent groups defined by general formula (I-a) with E being X and Z being -EC(X)NH—, while polymerization of a general formula (VII) compound can result in a homo- or interpolymer that includes pendent groups defined by general formula (I-a) with E being X and Z being —NHC(X)E-.

Polymers resulting from polymerization of general formulae (VIII)- or (X)-type compounds have hydrocarbon backbones with pendent groups as described above in connection with the descriptions of, respectively, Processes 2 and 3. (The description of Z in the preceding paragraph is equally applicable to the polymerization products of general formula (X) compounds.)

The polymerizations of each of general formulae (IV), (VII), (VIII), or (X) compounds can be homopolymerizations, can involve two or more such compounds, or can involve one or more comonomers. Those ethylenically unsaturated compounds that can participate in emulsion polymerizations and that can be radically initiated are preferred. Non-limiting examples include polyenes, particularly conjugated dienes, and vinyl compounds, particularly (meth)acrylates and derivatives thereof. The numerical (mole) percentage of mer derived from inventive release polymers is at least 33%, generally at least 50%, 55%, 60% or 65%, commonly at least 67% or 70%, and typically at least 75% or more. The numerical (mole) percentage of mer derived from inventive release polymers often is at least 80%, 85%, 90% or even 95%.

The molecular weights of the resulting polymers preferably are similar to those of PVOH (used in the manufacture of PVODC) described above, i.e., generally $M_w \approx 125 \pm 75$ kg/mol, commonly $M_w \approx 125 \pm 50$ kg/mol, and typically $M_w \approx 125 \pm 25$ kg/mol.

The VOC contents of these polymers generally is less than 5 ppm, commonly less than 3 ppm, more commonly less than 2 ppm, and typically less than 1 ppm. In many embodiments, the polymers are VOC-free.

Advantageously, the inventive polymers and the polymeric products of the inventive processes can be processed and employed similarly to water-based PVODC as well as other aqueous deliverable release polymers, e.g., polysiloxanes. Accordingly, they can be applied to a variety of substrates, including various papers, foils and polymeric films, using conditions, coating thicknesses, coating speeds, etc., very similar to those employed with PVODC, as well as a number of other release polymers.

While various embodiments of the present invention have been provided, they are presented by way of example and not limitation. To the extent feasible, as long as they are not interfering or incompatible, features and embodiments described above in isolation can be combined with other features and embodiments.

The relevant portions of any document specifically referenced in the preceding text or in the examples that follow are incorporated herein by reference.

The following non-limiting, illustrative examples provide the reader with detailed conditions and materials that can be useful in the practice of the present invention.

EXAMPLES

Unless a specific source is indicated, all chemicals used in the following examples are available from general chemical suppliers such as, for example, Sigma-Aldrich Co. (St. Louis, Mo.).

Example 1

Process 1b Reaction

After being charged with 165.0 g octadecanol, a 1L reactor was heated to ~60° C. (Octadecanol is a general formula (V) compound with $R^3 = C_{18}$ alkyl group and $E = O$.)

After melting of the alcohol, the reactor was maintained at ~67° C. while 95.0 g isocyanatoethyl methacrylate was added slowly over the course of ~60 minutes. (Isocyanatoethyl methacrylate is a general formula (VI) compound with $R^1$ =methyl group, each X =O and $R^2$ =$C_2$ alkylene group.)

The contents of the reactor were stirred for ~2 hours while the water bath was maintained at ~67° C.

The reaction vessel was removed from the water bath, and the contents of the reactor were poured into a jar. The product of this reaction was N-methacryloxyethyl octadecyl carbamate, a general formula (VII) compound with $R^1$=methyl group, each X=O, $R^2$=$C_2$ alkylene group, E=O, and $R^3$=$C_{18}$ alkyl group.

Example 2

Comparative, Process 1b-Type Reaction

The process of Example 1 was essentially repeated, substituting oleyl alcohol for octadecanol. Oleyl alcohol, also known as cis-9-octadecen-1-ol, is a general formula (V)-like compound with E=O but having $R^3$ replaced with a $C_{18}$ alkenyl group.

The product of this reaction was N-methacryloxyethyl oleyl carbamate, a compound similar to a general formula (VII) compound with $R^1$=methyl group, each X=O, $R^2$=$C_2$ alkylene group, E=O, and $R^3$=$C_{18}$ alkenyl group. The unsaturation in the $R^3$ group provides a close comparative relative to the saturated $R^3$ group from the product of Example 1.

Example 3

Process 1a Reaction

After being charged with 295.5 g octadecyl isocyanate, a 1 L reactor was heated to ~50° C. (Octadecyl isocyanate is a general formula (II) compound with $R^3$=$C_{18}$ alkyl group and X=O.)

While the isocyanate was maintained in a molten state, to the reactor was added, sequentially, two drops of DABCO™ T-120 dibutyltin dilaurylmercaptide catalyst (Air Products and Chemicals Inc.; Allentown, Pa.) and 116.0 g hydroxyethyl acrylate over the course of ~30 minutes. (Hydroxyethyl acrylate is a general formula (III) compound with $R^1$=H, each X=O, E=O and $R^2$=$C_2$ alkylene group.)

The water bath was raised to ~77° C., and the contents of the reactor were stirred for ~1 hour.

The reaction vessel was removed from the water bath, and the contents of the reactor were poured into a jar. The product of this reaction was N-octadecyl acryloxyethyl carbamate, a general formula (IV) compound with $R^1$=H, each X=O, E=O, $R^2$=$C_2$ alkylene group, and $R^3$=$C_{18}$ alkyl group.

Example 4

Process 3 Reaction

A 1 L reactor containing ~296 g octadecyl isocyanate was heated to ~50° C. so as to melt the isocyanate. To the reactor was added 2 drops DABCO™ T120 dibutyltin dilaurylmercaptide catalyst before ~120 g butanediol vinyl ether was added slowly over ~30 minutes. The temperature was raised to ~85° C. to keep the product from solidifying during ~60 minutes of stirring.

The product of this reaction will be N-octadecyl-O-1,4-vinyloxybutoxy carbamate, a general formula (XI) compound with $R^1$=H, n=1, X=O, $R^7$=$C_4$ alkylene group, $R^3$=$C_{18}$ alkyl group and Z represents a divalent carbonyl-containing group that further includes two additional heteroatoms bonded to the C atom of the carbonyl moiety, specifically O and N atoms.

Examples 5-11

Copolymers and Use as Release Coating

A homogenizer was preheated with hot deionized water and then drained. Through the homogenizer was circulated a mixture of 222 g deionized water, 7.4 g DISPONIL™ AFX 4070 nonionic surfactant (BASF Corp.; Florham Park, N.J.), 12.0 g TOMADOL™ 25-9 nonionic surfactant (Air Products), 0.2 g n-dodecyl mercaptan, 12.0 g of a 50% aqueous acrylamide solution and one of the following sets of reactants:

| | stearyl acrylate | alkoxylated tetrahydrofurfuryl acrylate* | product of Ex. 1 | product of Ex. 2 | product of Ex. 3 |
|---|---|---|---|---|---|
| Ex. 5 | 162.5 g | — | — | — | — |
| Ex. 6 | 100.9 g | 61.6 g | — | — | — |
| Ex. 7 | 135.0 g | 27.5 g | — | — | — |
| Ex. 8 | — | — | 162.5 g | — | — |
| Ex. 9 | — | — | — | 162.5 g | — |
| Ex. 10 | — | — | — | — | 162.5 g |

*SARTOMER™ SR611 acrylate (Sartomer Americas; Exton, Pennsylvania)

Each mixture was circulated at ~34.5 MPa (5000 psi) for at least 10 minutes at 70° C. before being charged into a reactor where it was maintained at 70°-75° C. with $N_2$ bubbled therethrough for ~30 minutes.

To each reaction mixture was added a solution of 3.4 g sodium persulfate in 30.6 g deionized water, with the resulting mixtures being maintained at ~70° C. for ~3 hours.

The reactor was cooled to less than ~50° C. before each set of contents was removed and filtered through a 25 μm bag into separate collection jars.

Portions of each of the release materials, as well as a PVODC having a $M_w$ of ~133,000 Daltons and a midpoint $T_g$ of ~62.5 C (comparative Example 11), were applied to PET films having thicknesses of 0.051 mm (2 mils). These coated films then were laminated to the adhesive side of three different self-wound masking tapes:

3M 234—solvent-based natural rubber adhesive (3M; St. Paul, Minn.),

CP 27—water-based acrylic adhesive (Shurtape; Hickory, N. Carolina), and

PG 500—hot-melt based adhesive (Intertape Polymer Group; Marysville, Mich.).

The coated test films (tape laminates) were tested either immediately (for initial release) or aged (heat conditioned) for ~16 hours at a constant temperature of 65° C. and 60% relative humidity.

Strips of self-wound tape articles cut to ~2.54 cm (1 in.) wide and ~12 cm (5 in.) long were laminated without heat using a 2.54 cm wide double-coated adhesive paper tape applied to the release side of the test strip. The attached test strip was rolled twice on the working platen with a 2 kg rubber roller moving at a rate of ~0.005 m/sec (1 ft./min.).

Each test film was evaluated using the Pressure Sensitive Tape Council's Peel Adhesion of Pressure Sensitive Tape methodologies (PSTC-101, rev. 05-2007, test methods A (180° peel) and F (90° peel)). The resulting release test values are a quantitative measure of the force required to remove a flexible adhesive tape from a coating of a given release material at a specific angle and rate of removal.

In the test designated 101-A below, the strip of adhesive tape was pulled from the release coated material at an angle of 180° and a rate of 0.005 m/sec (1 ft./min.). The force required to remove the adhesive from the release coating was measured over a 5 second data collection time.

In the test designated 101-F below, the strip of adhesive tape was pulled from the release coated material at an angle of 90° and a rate of 0.255 m/sec (50 ft./min.). The force required to remove the adhesive from the release coating was measured over a 5 second data collection time.

Each release coating also was evaluated using the Tack Rolling Ball (PSTC-6 test method, rev. 10-2003).

The results of the foregoing tests on each type of tape sample are summarized in the following three tables.

TABLE 1

Performance Testing on 3M 234 tape

| | Initial | | | Humidity Aged | | |
|---|---|---|---|---|---|---|
| | 101-A (N/m) | 101-F (N/m) | Ball Tack | 101-A (N/m) | 101-F (N/m) | Ball Tack |
| Example 5 (comparative) | 129 | 150 | 0.3 | 244 | 378 | 5 |
| Example 6 (comparative) | 128 | 76 | 0.6 | 207 | 466 | 1.8 |
| Example 7 (comparative) | 133 | 50 | 0.4 | 246 | 359 | 5 |
| Example 8 | 149 | 57 | 0.2 | 196 | 120 | 0.2 |
| Example 9 | 212 | 267 | 0.4 | 287 | 417 | 0.2 |
| Example 10 | — | — | — | 186 | 50 | 0.2 |
| Example 11 (PVODC) | 145 | 49 | 0.4 | 188 | 80 | 0.2 |

TABLE 2

Performance Testing on CP 27 tape

| | Initial | | | Humidity Aged | | |
|---|---|---|---|---|---|---|
| | 101-A (N/m) | 101-F (N/m) | Ball Tack | 101-A (N/m) | 101-F (N/m) | Ball Tack |
| Example 5 (comparative) | 29 | 27 | 1.5 | 150 | 113 | 1.3 |
| Example 6 (comparative) | 33 | 38 | 1.7 | 153 | 255 | 0.9 |
| Example 7 (comparative) | 32 | 23 | 1.6 | 126 | 147 | 1.2 |
| Example 8 | 35 | 38 | 1.3 | 76 | 6.6 | 0.7 |
| Example 9 | 112 | 134 | 1.4 | 284 | 273 | 0.9 |
| Example 10 | — | — | — | 64 | 31 | 1.2 |
| Example 11 (PVODC) | 20 | 21 | 1.4 | 91 | 49 | 1 |

TABLE 3

Performance Testing on PG 500 tape

| | Initial | | | Humidity Aged | | |
|---|---|---|---|---|---|---|
| | 101-A (N/m) | 101-F (N/m) | Ball Tack | 101-A (N/m) | 101-F (N/m) | Ball Tack |
| Example 5 (comparative) | 77 | 75 | 1.6 | 460 | 322 | 5 |
| Example 6 (comparative) | 209 | 44 | 0.7 | 249 | 259 | 2.9 |
| Example 7 (comparative) | 436 | 333 | 3 | 292 | 152 | 5 |
| Example 8 | 57 | 16 | 1.6 | 64 | 30 | 0.3 |
| Example 9 | 297 | 80 | 1.5 | 422 | 268 | 0.3 |
| Example 10 | — | — | — | 39 | 16 | 0.2 |
| Example 11 (PVODC) | 37 | 12 | 1.6 | 55 | 23 | 0.4 |

While Tables 1-3 contain much of interest, two trends merit specific mention.

The humidity aged performance of Examples 8 and 10 are far better than those of comparative Examples 5-7 and are very comparable to those of PVODC (Example 11).

Additionally, a comparison of the data for Examples 8 and 9, particularly the peel test results, indicates the importance that $R^3$ be a long chain alkyl group and not include unsaturation.

Examples 12-13

Comparison Against Polyurethane Coatings

A variety of modified polyurethanes have been known to provide release properties in a variety of tape applications, particularly as the release polymer component of LABs; see, e.g., U.S. Pat. Nos. 3,997,702 and 5,750,630. Little to no VOCs are released during application and curing of polyurethane-based release coatings.

The release performance of coatings employing a polymer similar to the one used in Example 10 above (Example 12) were compared against those for RA-15W modified polyurethane (Hitac Adhesives and Coatings; Venice, Calif.). The latter is promoted as providing coatings that have release properties very similar to those of PVODC-based coatings.

Portions of each type of release polymer were coated on creped paper.

A ~2.5 cm×~12.5 cm (1 in. wide × 5 in. long) strip of PG 24 self wound tape of a solvent-based natural rubber adhesive (Intertape Polymer Group) was laminated to each release coated paper. Each laminated sample was conditioned for ~20 hours in a 65° C. forced air oven before testing.

The test samples were evaluated using the aforementioned Method F of PSTC-101 at
Rate 1: 0.254 m/sec (50 ft./min.) and
Rate 2: 0.508 m/sec (100 ft./min.).
Additionally, a variation of the test (peel angle of 135° at a speed of 0.508 m/sec (100 ft./min.)) also was performed under the same setup and conditions.

The values in Table 4 below for Example 12 are the averages of two runs, while those for the modified polyurethane (comparative Example 13) are from a single evaluation.

TABLE 4

PSTC-101 (Method F) Testing on PG 24 tape

| | 90° peel, rate 1 (N/m) | 90° peel, rate 2 (N/m) | 135° peel, rate 2 (N/m) |
|---|---|---|---|
| Example 12 | 37 | 30 | 23 |
| Example 13 (comparative) | 558 | 734 | 682 |

In each of the peel tests of humidity aged release coatings, the performance of Example 12 far exceeded that of comparative Example 13.

Examples 14-16

Comparison Against Silicone-based Coatings

Polysiloxane-based release coatings are used widely, particularly as release liners for labels. These so-called silicone polymers, which can be provided by aqueous coating mechanisms, thereby avoiding the aforementioned VOC issues of some other release coating options, and are generally considered as providing the easiest (i.e., highest) level of release. For additional details on such systems, the interested reader is directed to any of a variety of publications such as G. V. Gordon et al., "Silicone Release Coatings: A Closer Look at Release Mechanisms," Dow Corning Corp. brochure (1998), available for download at www.dowcorning.com/content/publishedlit/26-016.pdf.

The release performance of coatings employing a polymer similar to the one used in Example 10 above (Example 14) were compared against those for two different silicone-based release coatings:
Example 15—standard sample obtainable from Chemsultants International (Mentor, Ohio), and
Example 16—release liner employed in self-adhesive applications by Green Bay Packaging (Green Bay, Wis.).
Portions of each type of release polymer were coated on super-calendered kraft paper.

A ~2.5 cm×~12.5 cm (1 in. wide x 5 in. long) strip of PET film coated with NovaCryl™ PS-R 300 acrylic removable PSA (OMNOVA Solutions; Beachwood, Ohio) was laminated to each release coated paper. Each laminated sample was conditioned for ~170 hours (7 days) in a 65° C., 60% relative humidity chamber before testing.

Each test film was evaluated using the Pressure Sensitive Tape Council's Peel Adhesion of Pressure Sensitive Tape methodologies (PSTC-101, rev. 05-2007, test methods A (180° peel) and F (90° peel)), as set forth above in Examples 5-11.

The results are summarized in Table 5 below, where the values for Example 14 are the averages of three runs, while those for the silicone-based products (comparative Examples 15 and 16) are from a single evaluation.

TABLE 5

PSTC-101 Testing on NovaCryl™ PS-R 300 PSA

| | 101-A, 180° peel (N/m) | 101-F, 90° peel (N/m) |
|---|---|---|
| Example 14 | 12 | 20 |
| Example 15 (comparative) | 2 | 8 |
| Example 16 (comparative) | 2 | 6 |

The silicone-based release coatings (Examples 15-16) clearly had the easiest release (i.e., highest level of release) with the noted acrylic PSA in both tests. Nevertheless, the level of release provided by Example 14 is within the range of release considered to be "tight."

A release coating such as the one from Example 14 certainly would be deemed acceptable for many commercial applications calling for a polysiloxane-free release coating that can provide acceptable release properties, even after being aged at an elevated temperature and humidity.

That which is claimed is:

1. A release polymer comprising at least 67 mole percent mer units that comprise a pendent group that comprises at least two (thio)carbonyl moieties, the C atom of at least one of said (thio)carbonyl moieties being bonded to two additional heteroatoms, one of said additional heteroatoms being a nitrogen atom and the other being selected from O, S and N, said release polymer exhibiting less than 0.5 parts per million volatile organic chemicals when subjected to standard analytical testing procedures for such chemicals.

2. The release polymer of claim 1 wherein said pendent group is defined by the formula

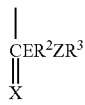

where
X is an O or S atom,
E is X or NR' where R' is H or a $C_1$-$C_6$ alkyl group,
$R^2$ is a lower alkyl, aryl, alkaryl or aralkyl group, optionally containing a heteroatom, with the proviso that no active hydrogen atoms are present,
Z is a divalent (thio)carbonyl-containing group that further comprises two additional heteroatoms bonded to the C atom of the (thio)carbonyl moiety, one of said additional heteroatoms being a nitrogen atom and the other being selected from O, S and N, and
$R^3$ is a long chain alkyl group or a larger moiety that includes a long chain alkyl group.

3. The release polymer of claim 2 wherein said pendent group is defined by either of

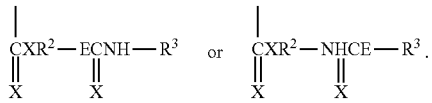

4. The release polymer of claim 1 wherein said polymer comprises at least 75 mole percent mer units that comprise said pendent group.

5. The release polymer of claim 1 wherein said polymer comprises at least 95 mole percent mer units that comprise said pendent group.

6. The release polymer of claim 1 further comprising at least one of (meth)acrylate mer and mer resulting from incorporation of one or more (meth)acrylate derivatives.

7. An article comprising a surface bearing an adhesive layer and a surface bearing a release layer comprising the release polymer of claim 1, said release layer contacting said adhesive layer.

8. The article of claim 7 wherein said adhesive layer and said release layer are on opposing primary surfaces of a substrate.

9. The release polymer of claim 1 wherein said pendent group is defined by the formula

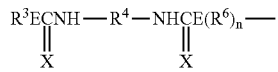

where
X is an O or S atom,
E is X or NR' where R' is H or a $C_1$-$C_6$ alkyl group,
$R^3$ is a long chain alkyl group or a larger functionality that includes a long chain alkyl group,
$R^4$ is the radical of a hydrocarbon compound having two iso(thio)cyanate groups of differing reactivities,
$R^6$ is an optional linking group, and
n is 0 or 1.

10. The release polymer of claim 9 wherein n is 1 and $R^6$ is a —$R^2$XC(X)— group where $R^2$ is a lower alkyl, aryl, alkaryl or aralkyl group, optionally containing a heteroatom, with the proviso that $R^2$ is free of active hydrogen atoms.

11. A process for producing a release layer for an adhesive-containing article, said process comprising applying to a substrate a composition that comprises the release polymer of claim 1, said composition comprising less than 0.5 ppm volatile organic chemicals.

12. The process of claim 11 wherein said composition consists essentially of said release polymer.

13. The process of claim 11 wherein said composition comprises less than 0.25 ppm volatile organic chemicals.

14. The process of claim 11 wherein said composition comprises less than 0.1 ppm volatile organic chemicals.

15. The process of claim 11 wherein said composition comprises less than 0.05 ppm volatile organic chemicals.

16. The process of claim 11 wherein said composition is applied to a primary surface of a substrate, the other primary surface of said substrate bearing an adhesive layer.

* * * * *